2 Sheets—Sheet 1.

S. B. TURNER.

HEDGE-TRIMMERS.

No. 7,041. Reissued April 4. 1876.

Witnesses:
L. Van Riswick
D. Hannay

Inventor:
Samuel B. Turner
By W. B. Richards
Atty

N. PETERS, PHOTO-LITHOGRAPHER, WASHINGTON, D. C.

2 Sheets—Sheet 2.

S. B. TURNER.

HEDGE-TRIMMERS.

No. 7,041. Reissued April 4, 1876.

Witnesses:
L. Van Riswick.
L. Hannay

Inventor:
Samuel B. Turner,
By W. B. Richards,
Atty.

N. PETERS, PHOTO-LITHOGRAPHER, WASHINGTON, D. C.

UNITED STATES PATENT OFFICE.

SAMUEL B. TURNER, OF QUINCY, ILLINOIS.

IMPROVEMENT IN HEDGE-TRIMMERS.

Specification forming part of Letters Patent No. 138,106, dated April 22, 1873; reissue No. 7,041, dated April 4, 1876; application filed February 1, 1876.

*To all whom it may concern:*

Be it known that I, SAMUEL B. TURNER, of Quincy, county of Adams, and State of Illinois, have invented certain new and useful Improvements in Hedge-Trimmers, of which the following is a specification:

My invention relates to a device for passing along by the side of a hedge and trimming it, with a cutter consisting of a sickle of an ordinary reaping or mowing machine, either in its ordinary form or slightly modified; and the invention consists, first, in providing devices for adjusting the height of the heel of the sickle; second, in providing devices for adjusting the height of the point of the sickle; third, in making the devices for adjusting the height of the point of the sickle readily and easily movable, so that the sickle may be raised and lowered, and its angle to a horizontal plane adjusted and changed, as desired, and as the machine passes along; and, fourthly, in connecting the sickle-point-adjusting devices to the finger-bar in such manner that the trimmings from the brush may fall clear of the operating devices, all as hereinafter fully described.

Figure 1:
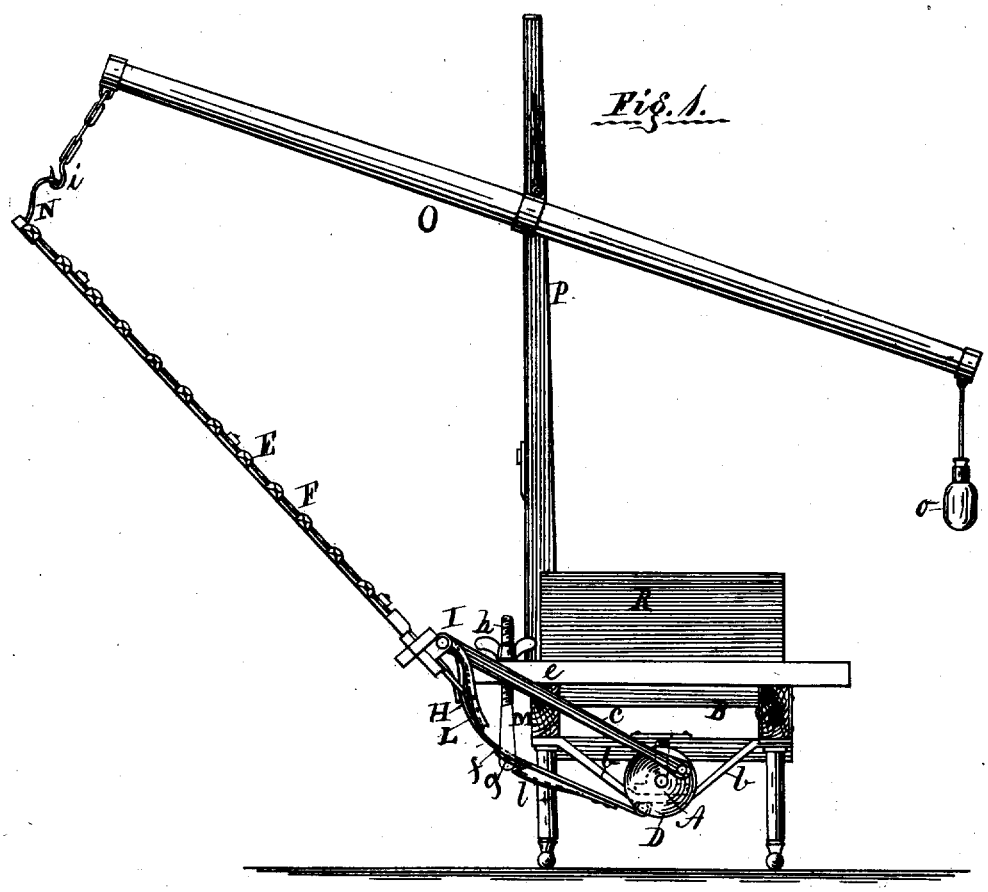
Figure 2:
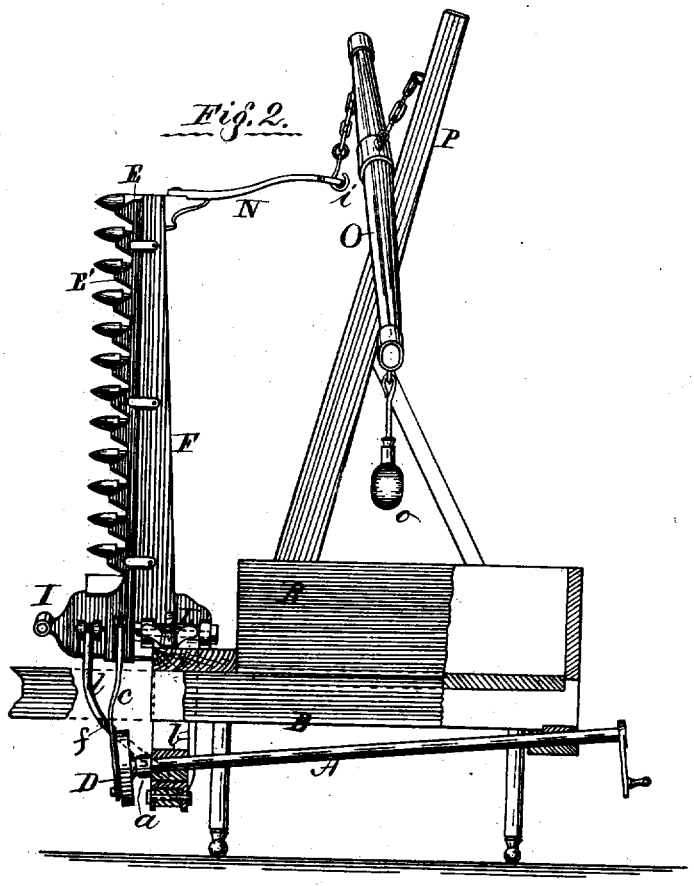

The accompanying drawings illustrate my invention, Figure 1 being a front elevation, and Fig. 2 a side elevation, partly in section.

The same letter throughout the drawings refers to the same parts.

A is a driving-shaft of any ordinary construction, is journaled to the frame B, and operated in any suitable manner, as by means of a beveled gear-wheel engaging a corresponding wheel upon the axle upon which the frame B is mounted. The front extremity of the driving-shaft A is provided with a crank-wheel, D, having a washer, *a*, to prevent its coming in contact with the outer edge of the hanger *b*. E is the sickle or cutter bar, provided with sectional teeth E′ of the ordinary reaping-machine form, but preferably blunt-pointed, as shown in the drawings, and is carried in the ordinary finger-bar F, which may be tapered toward its outer end to lessen its weight. *c* is the pitman-rod, connecting the sickle-bar E with the balance crank D, from which it receives motion. The rest H, secured to the shoe I, is curved or bent outward in such manner that its convex surface, coming in contact with the coupling-bar L, serves to sustain the finger-bar F at an angle of about forty-five degrees. The coupling-bar is hinged below the center of the hanger *b*, so as to have a vertical movement, and is provided with a brace, *l*, one end of which is rigidly attached to the under side of the coupling-bar L, the other being pivoted between the ears on the shoe I. The outer extremity of the coupling-bar is connected by pivoting to the finger-bar, in the manner of the ordinary reaping or mowing machines, and is so inclined or curved upward that when the rest H is in contact with the lower surface of the coupling-bar L the finger-bar will incline at an angle of about forty-five degrees. At a proper point below the end of the front brace of the frame B the coupling-bar L is perforated with an elongated slot, *f*, through which one end of the rod M projects, its lower extremity being provided with a pin, *g*, to prevent its passing upward through the slot *f*. Th upper end of the rod M projects above the bar *e*, and is threaded and provided with a flanged nut, *h*, by means of which the coupling-bar L may be raised and lowered, and thus adjusted at any desired height to fix the height of the heel of the cutter-bar E. The threaded rod M and nut *h* not only serve as a means of raising and lowering the heel of the cutter-bar, but also serve as a rigid support, so as to prevent its being jolted up or thrown out of place by an occasional stiff branch with which it might come in contact, and for the same reason it is of great service when the wheels pass over clods or sudden inequalities in the ground, such as are frequently found close to hedges. An arm, N, is properly secured to the rear side of the end of the finger-bar, its extremity having a loop, through which passes a hook, *i*, on the end of a chain, secured to one extremity of a lever, O, which is suspended properly by a chain or other suitable means, at about its longitudinal center of gravity, to the front edge of the standard P, the opposite end of the lever O being provided with a weight, *o*, as a counterpoise to the weight of the cutting devices. The standard P is secured in a properly-inclined position to the box R, mounted upon the frame B, and attached thereto in any proper manner. The arm N is curved upward and backward from the finger-bar, as shown in the drawings. On the side of the frame B opposite that adjacent to the sickle-bar is provided the bar S, to which a tongue or thills may be attached in any desired manner.

The operation of my invention is as follows: Before starting the machine the height of the cut is regulated by means of the flanged nut *h*, as already described. The propelling power being then attached to the bar S, the machine may be moved along one side of the hedge, in such relation thereto that the sickle may operate upon it. Thus, as the sickle, being in rapid motion, comes in contact with the stalks of the hedge, they are instantly severed, falling in the rear of the sickle-bar, the curved arm N allowing those cut near the end of the sickle to fall back without striking the connecting parts between the sickle and the weighted lever O. During the passage of the machine the weighted end of the lever O may be allowed to descend for the purpose of raising the sickle, to prevent its coming in contact with old wood or other material in the hedge, which might damage the sickle, and also to raise and lower the sickle, to preserve a uniform height of cut as the supporting-wheels of the device pass over irregularities of surface in the ground, and for other purposes.

A repetition of the above operation upon the other side of the hedge completes the trimming, leaving that portion of the hedge above the level of the lower finger cut downward on each side to an angle of about forty-five degrees.

I have described my invention, in a manner, as an independent machine; but it will be evident that the propelling and supporting devices, as also the cutting devices, may be the parts of an ordinary mowing-machine, especially the "Buckeye machine," the differences in connection of the parts and in construction being as hereinbefore described.

What I claim as my invention, and desire to secure by Letters Patent, is—

1. The rod M, flanged nut *h*, and pin *g*, combined to operate with the coupling-bar L, having slot *f*, pitman *c*, bar *e*, and sickle-bar E, substantially as described, and for the purpose specified.

2. The lever O, connecting the post P and the outer end of the finger-bar F and sickle-bar E, substantially as described, and for the purpose set forth, 3. The oscillating lever O, for raising and lowering the outer end of the finger-bar, combined with the post P, finger-bar F, and sickle-bar E, substantially as described, and for the purpose specified.

4. The arm N, curved as described, and combined with the sickle-bar E, finger-bar F, and weighted lever O, substantially as described, and for the purpose specified.

SAMUEL B. TURNER.

Witnesses:

E. G. BALDWIN,

WM. R. LOCKWOOD.